United States Patent [19]

Bisantz

[11] Patent Number: 4,973,871
[45] Date of Patent: Nov. 27, 1990

[54] STATOR ASSEMBLY HAVING MAGNET RETENTION BY MECHANICAL WEDGE CONSTRAINT

[75] Inventor: Denis J. Bisantz, Chagrin Falls, Ohio

[73] Assignee: Lucas Aerospace Power Equipment Corporation, Maple Heights, Ohio

[21] Appl. No.: 399,064

[22] Filed: Aug. 23, 1989

[51] Int. Cl.[5] ............................................. H02K 1/18
[52] U.S. Cl. ..................................... 310/154; 310/42; 310/91; 310/214; 310/258
[58] Field of Search ................ 310/154, 152, 153, 155, 310/254, 258, 259, 42, 89, 91, 214

[56] References Cited

U.S. PATENT DOCUMENTS

| | | | |
|---|---|---|---|
| 2,602,098 | 7/1952 | Ross | 310/154 |
| 2,683,826 | 7/1954 | Staak | 310/154 |
| 3,090,877 | 5/1963 | Baumhart | 310/154 |
| 3,091,713 | 5/1963 | Latta | 310/154 |
| 3,249,780 | 5/1966 | Ibrahim | 310/154 |
| 3,873,864 | 3/1975 | Apostoleris | 310/154 |
| 4,071,794 | 1/1978 | Schoen | 310/154 |
| 4,155,021 | 5/1979 | Corbach | 310/154 |
| 4,237,394 | 12/1980 | Aoki | 310/154 |
| 4,322,646 | 3/1982 | Persson | 310/154 |
| 4,542,314 | 9/1985 | Corbach | 310/154 |

FOREIGN PATENT DOCUMENTS

| | | | |
|---|---|---|---|
| 0017524 | 10/1980 | European Pat. Off. | 310/154 |
| 0289420 | 12/1913 | Fed. Rep. of Germany | 310/258 |
| 2855986 | 7/1980 | Fed. Rep. of Germany | 310/154 |
| 0051511 | 4/1977 | Japan | 310/154 |
| 1118604 | 7/1968 | United Kingdom | 310/154 |
| 1142591 | 2/1969 | United Kingdom | 310/154 |

Primary Examiner—R. Skudy
Attorney, Agent, or Firm—Pearne, Gordon, McCoy & Granger

[57] ABSTRACT

A stator assembly for a d.c. electric motor/generator has a pair of permanent magnet segments located on the interior surface of the yoke. The magnet segments are held in place by a pair of wedges which are attached to the yoke. The wedges are tapered inwardly and the magnet segments are tapered outwardly to hold the magnet segments in place against the interior surface of the yoke. The tapered magnet segments also reduce cogging torques produced on the armature due to the gradual fall off of the magnetic flux at the tapered side edges of the magnet segments.

23 Claims, 2 Drawing Sheets

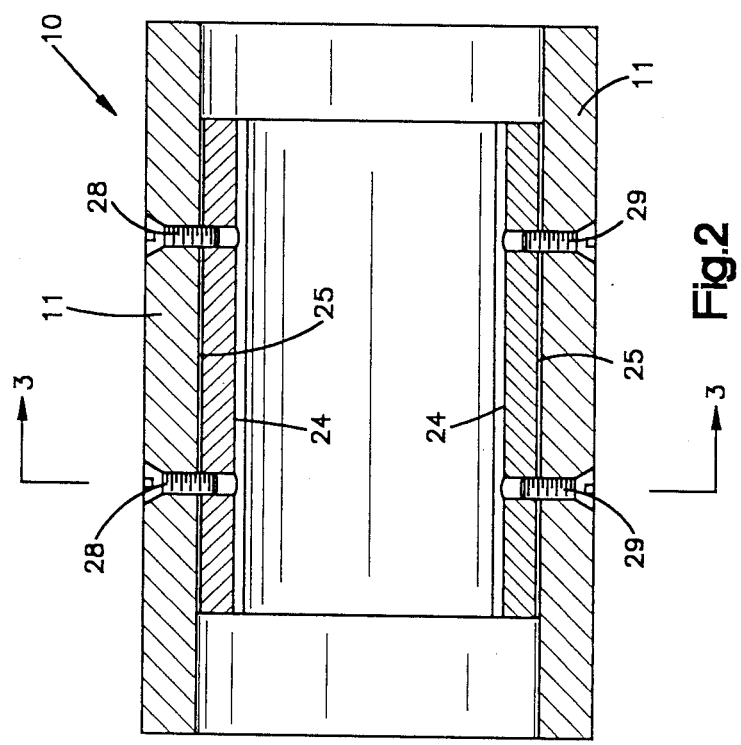
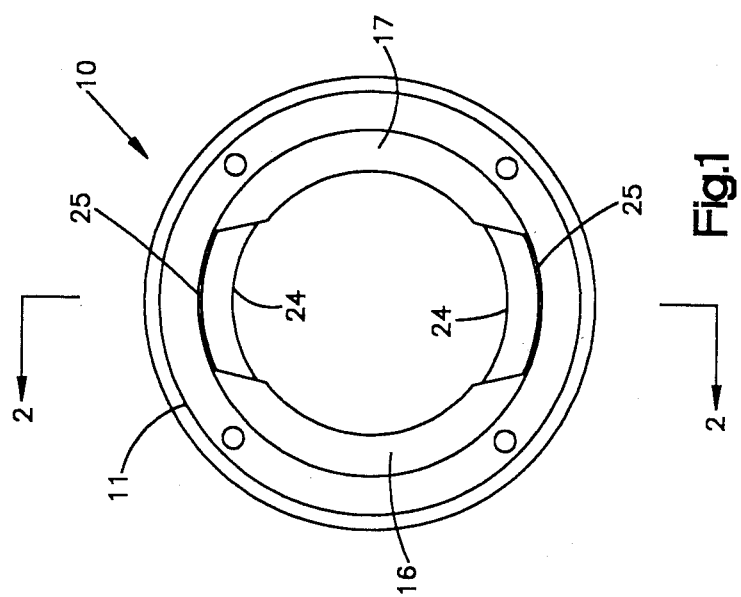

STATOR ASSEMBLY HAVING MAGNET RETENTION BY MECHANICAL WEDGE CONSTRAINT

TECHNICAL FIELD

This invention relates to the construction of d.c. electric motors and generators using permanent magnet segments as part of the stator, and more particularly to the assembly and retention of the permanent magnet segments on the stator.

BACKGROUND ART

In the design and assembly of d.c. motors and generators that use permanent magnet segments in the stator design, the magnet segments must be held in place in the stator structure for proper motor operation. At present, there are several ways of building motors or generators and keeping the magnet segments in place.

One concept involves only the use of adhesive bonding of the magnet segments to the outer stator housing or yoke. The magnet segments may be held in place only through the use of an adhesive bonding agent, or the adhesive may be used in conjunction with the other concepts discussed below. When the magnet segments are bonded together only with an adhesive bonding agent and the adhesive bond fails, a magnet segment will fall onto the armature preventing the armature from rotating, and causing the electric motor or generator to fail.

Adhesive bond failure can occur through various causes. The most notable causes of adhesive bond failure are improper surface preparation, improper adhesive mixing, excessive voids trapped in the adhesive between the magnet segments and the yoke, corrosion formed on the surface between the yoke and the magnet segments where bonding is to take place, and trapped moisture in the adhesive.

Another concept involves an arched magnet segment construction. This construction is sometimes called a "keystone" construction, and depends upon the wedge shape of the individual magnet segments to hold the assembly together. While this construction does work, it requires that very close tolerances be maintained on all joining pieces to keep the magnet segments from falling onto the armature. The air gap between armature and stator magnet is typically very small, i.e., 0.010 inch (0.25 mm). The smaller the air gap, the closer the tolerance required for the wedge shaped pieces. There is another disadvantage of this design when it is used in conjunction with the use of an adhesive because, when the last wedge is inserted, all or most of the adhesive will be wiped from it because of the tight fit required between the pieces.

A third concept involves a notched magnet segment/wedge construction. This construction reduces the tolerance problem of the design just discussed, but it requires that a step or notch be put into the edge of the magnet segments. The provision of such a step or notch may not be possible on thin magnet segments. Furthermore, the magnet material which is brittle, tends to crack in the location of the notch.

A fourth concept involves a spring clip construction. In this construction, the magnet segments are wedged together, and a spring is used to apply a spring force on the brittle magnet edge surface. This construction is difficult to accomplish successfully with thin magnet segments. Furthermore, it is not an ideal solution in high vibration or high temperature environments, because the spring clip can fatigue and/or degrade the mating surface of the magnet material.

A fifth concept involves a cradle construction. This construction cradles all of the magnet segments in a structure that is then attached to the yoke. This construction is essentially a structure within a structure. This construction is very expensive and may require a larger air gap to clear it. In order to accommodate a larger air gap, a larger magnet must be used, and this results in additional cost and well as space considerations.

DISCLOSURE OF THE INVENTION

The present invention provides a unique construction of retaining magnet segments in the stator assembly of an electric motor or generator which overcomes the difficulties and disadvantages of the prior art constructions and provides benefits and advantages heretofore not realized.

The present invention involves the use of wedges with the magnet segments in order to achieve a construction which provides for positive locking of all components to the base structure or yoke. Preferably, a pair of wedges are used, and the wedges are fixed to the yoke using screws or other attaching means, and the wedges have tapered side edges to lock the magnet segments in place. The magnet segments also have tapered edges to fit within the wedges. A pair of magnet segments are thus locked in place between the pair of wedges.

The design of the present invention overcomes the disadvantages of the prior art notched magnet segment and wedge construction in which a step was needed in the edge of the magnet. With the present invention, the "hard" magnetic side edge that most magnet constructions result in is tapered with a flat, planar surface. The lack of any step or notch avoids any problem of cracking of the brittle magnet material along the edge of the magnet segment.

The tapered side edges of the magnet segments also produce an unrelated and unexpected advantage. A gradual fall off of the magnetic flux created by the magnet edge results in a reduction of the cogging torque produced on the armature, resulting in smoother motor operation. Thus the construction of the present invention also provides for reduction of cogging torque requirements due to the tapered edge of the magnets. This reduction of the cogging torque can be achieved without armature skewing, thus avoiding a costly manufacturing problem.

Because only a pair of magnet segments and a pair of wedges are necessary to achieve the advantages of the present invention, the design provides for easier magnet assembly to the housing or yoke. The construction of the present invention also results in lower costs than the aforementioned prior art constructions. The construction is easier to fabricate and less expensive to manufacture because the design of the present invention uses simple machining of adjoining component surfaces. Furthermore, standard tolerances can be used in the construction, so that the higher tolerance problems of the prior art constructions are avoided.

These and other advantages are achieved by the present invention of a stator assembly for a dynamoelectric machine, The stator assembly comprises a yoke having a cylindrical interior surface. A pair of permanent magnet segments is located on the interior surface of the yoke. Each of the magnet segments has an arc shape forming a portion of a hollow cylinder. Each of the magnet segments has an outer surface which fits against the interior surface of the yoke and has an inner surface. Each of the magnet segments has axially extending side surfaces between the inner and outer surfaces. The side surfaces are tapered outwardly such that the outer surface of each of the magnet segments extends circumferentially beyond the inner surface of the magnet segment. A pair of wedges is located on the inner surface of the yoke. Each of the wedges has an outer surface which matches the interior surface of the yoke and has an inner surface. Each of the wedges has axially extending side surfaces which are tapered inwardly such that the inner surface of each of the wedges extends circumferentially beyond the outer surface of the wedge. The taper of the wedge is opposite to the taper on the magnet segments with at least one of the wedges holding the magnet segments in place against the interior surface of the yoke.

In accordance with another aspect of the present invention, the stator assembly comprises a yoke having a cylindrical interior surface. A pair of permanent magnet segments is located within the yoke against the interior surface. A pair of wedges is located within the yoke. Means are provided for attaching the wedges to the interior surface of the yoke. Each of the magnet segments has planar side surfaces extending axially along the length of the magnet segment on each side of the magnet segment. Each of the wedges has planar side surfaces extending axially along the length of the wedge on each side of the wedge. The side surfaces on at least one of the wedges engage the side surfaces of each of the magnet segments to hold the magnet segments in place against the yoke. Each of the planar side surfaces of each of the magnet segments contact one of the planar side surfaces of one of the wedges to form a contact plane. The contact plane forms an acute angle with respect to a radial plane with the side surfaces of the magnet segments tapered inwardly from the outer surface to the inner surface and the side surfaces of the wedges tapered outwardly from the inner surface to the outer surface, so that the magnet segments are held against the interior surface of the yoke by the wedges.

BRIEF DESCRIPTION OF THE DRAWINGS

FIG. 1 is a end elevational view of an electric motor/generator which can use the design of the present invention.

FIG. 2 is a side sectional view taken along line 2—2 of FIG. 1.

PREFERRED EMBODIMENT FOR CARRYING OUT THE INVENTION

Figure 3:
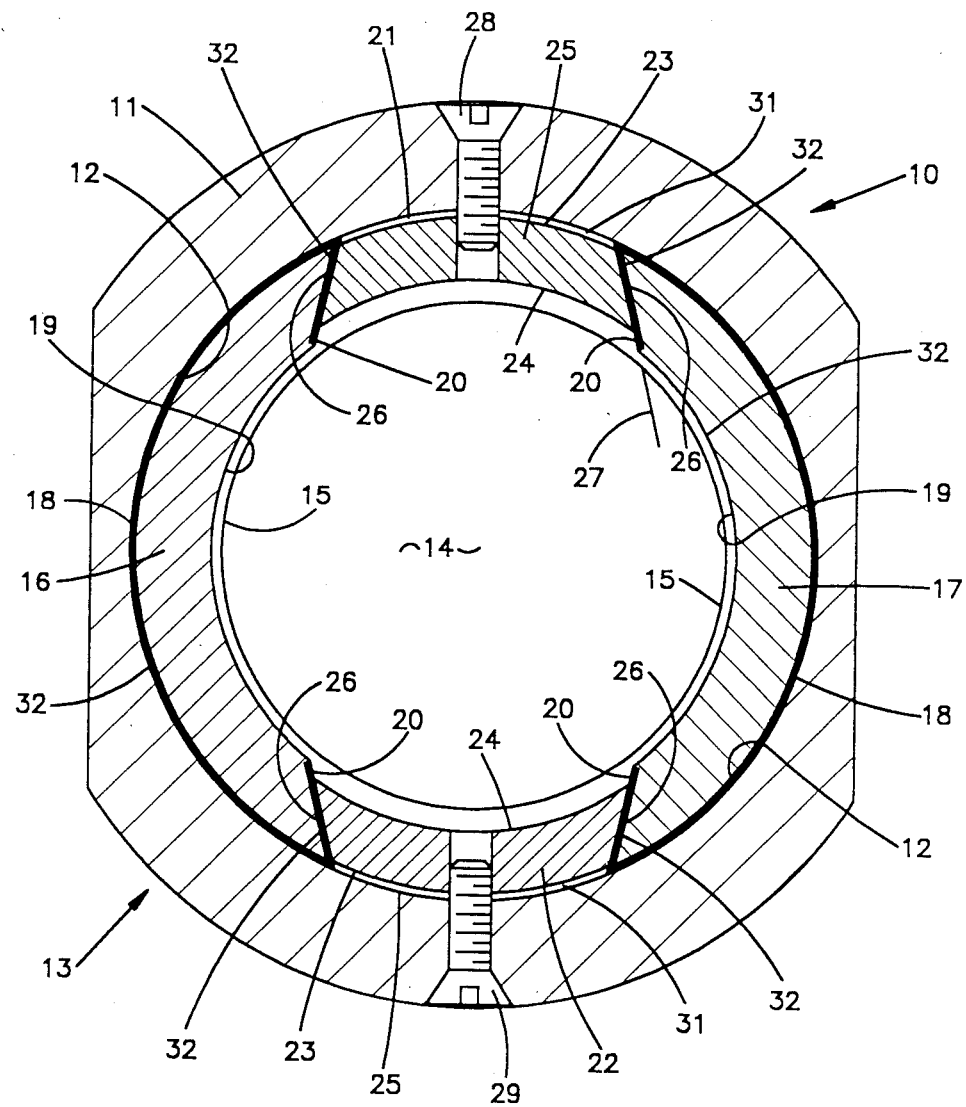
FIG. 3 is a end sectional view of the motor/generator taken along line 3—3 of FIG. 2 showing the design of the present invention.

Referring more particularly to the drawings, and initially to FIGS. 1 and 3, there is shown a two-pole electric d.c. motor/generator 10 which can use the design of the present invention. The motor/generator 10 is of an otherwise conventional design comprising an outer housing or yoke 11 having a cylindrical interior surface 12 forming a part of a stator assembly 13. The stator assembly 13 surrounds an armature 14 which is rotatable within the stator assembly and which is separated therefrom by an air gap 15.

Referring to FIG. 3, the stator assembly 13 comprises a pair of magnet segments 16 and 17 located radially opposite each other on the interior surface 12 inside the yoke 11. Each of the magnet segments 16 and 17 has an arc shape forming a portion of a hollow cylinder. Preferably, the magnet segments 16 and 17 are substantially identical in shape but are of opposite polarity so that, for example, the south pole may be provided on the left side of the stator of FIG. 3 by the magnet segment 16 and the north pole provided on the right side by the magnet segment 17. The magnet segments 16 and 17 may be of any suitable material such as, for example, samarium cobalt.

Each of the magnet segments 16 and 17 have a curved outer surface 18 which fits tightly against the interior surface 12 of the yoke 11 and a curved inner surface 19 which forms one side of the air gap 15. The thickness of the magnet segments 16 and 17 is determined by the motor/generator design such that a sufficient air gap 15 is provided between the magnet segments and the armature 14. Each of the magnet segments 16 and 17 also has tapered longitudinal side surfaces 20 which extend axially along the length of the magnet segment on each side of the magnet segment between the inner surface 19 and the outer surface 18. Each of the side surfaces 20 of each of the magnet segments 16 and 17 is tapered outwardly, so that the outer surface 18 of each of the magnet segments 16 and 17 extends circumferentially beyond the inner surface 19 of the magnet segment.

Between the side surfaces 20 of the magnet segments 16 and 17 are a pair of wedges 21 and 22. The wedges 21 and 22 are located radially opposite each other on the interior surface 12 inside the yoke 11 and at approximately 90° with respect to the magnet segments 16 and 17. The wedges 21 and 22, which need not be made of magnetic material, are preferably substantially identical in shape.

Each of the wedges 21 and 22 has a curved outer surface 23 which generally matches the interior surface 12 of the yoke and a curved inner surface 24 which forms one side of the air gap 15. The thickness of the wedges 21 and 22 is preferably slightly less than or substantially identical to the thickness of the magnet segments 16 and 17. The thickness of the wedges 21 and 22 may be less than the thickness of the magnet segments 16 and 17 because the air gap between the wedges and the armature 14 need not be kept to a minimum and because a small clearance 25 may be provided between the outer surface 23 of each of wedges and the interior surface 12 of the yoke 11 to accommodate radial adjustment of the wedges so as to assure that the wedges hold the magnet segments firmly against the interior surface of the yoke. The magnet segments 16 and 17 and the wedges 21 and 22 thus fit together to form a hollow cylinder, with the outer surfaces 18 and 23 combining to form a generally cylindrical surface which fits against and matches the interior surface 12 of the yoke 11 and the inner surfaces 19 and 24 combining to form a generally cylindrical surface which defines the outer boundary of the air gap 15.

Each of the wedges 21 and 22 have a tapered longitudinal side surfaces 26 which extends axially along the length of the wedge on each side of the wedge between the inner surface 24 and the outer surface 23. Each of the tapered side surfaces 26 matches the equal but oppositely tapered side surfaces 20 on one of the adjoining magnet segments 16 and 17. Each of the side surfaces 26 of each of the wedges 21 and 22 is tapered inwardly, so that the inner surface of each of the wedges 21 and 22 extends circumferentially beyond the outer surface 23 of the wedge. Each of the flat, planar side surfaces 26 of each of the wedges 21 and 22 contacts one of the flat, planar side surfaces 20 of one of the magnet segments 16 and 17 to form a contact plane 27. Because the wedges 21 and 22 and the magnet segments 16 and 17 are tapered, each of the contact planes 27 is not parallel to the intersecting plane lying along the radius of the assembly, but instead the contact planes each form acute angles with a radial plane.

Since the taper of the wedges 21 and 22 is opposite to the taper on the magnet segments 16 and 17, the magnet segments are held in place against the interior surface 12 of the yoke 11. The wedges 21 and 22 thus provide a mechanical restraint which results in a positive locking mechanism for the magnet segment and wedge assembly. The wedges 21 and 22 are also bonded between the edges of the magnet segments 16 and 17 to maintain the overall concentric profile and cylindrical structure form and reduce windage losses.

The wedges 21 and 22 are attached to the interior surface 12 of the yoke 11 by suitable fastener means, such as by screws 28 and 29 or by rivets or adhesive 31 or other devices. Because of the inward taper of the side surfaces 26 of the wedges 21 and 22 the outward taper of the side surfaces 20 of the magnet segments 16 and 17, the resulting assembly is mechanically locked in place on the yoke 11. To further secure the assembly, a suitable adhesive 32 may be applied between the side surfaces 20 of the magnet segments 16 and 17 and the side surfaces 26 of the wedges 21 and 22, as well as between the outer surface 18 of the magnet segments 16 and 17 and interior surface 12 of the yoke 11. A suitable adhesive may be, for example, a thixotropic two-part structural adhesive.

The tapered side surfaces 20 may be formed on the magnet segments 16 and 17 even in designs in which the magnet segments are thin since a flat, planar surface is provided, and a notch or step which might otherwise crack the brittle magnet material is avoided.

Referring to FIG. 2, the axial length of the stator may be made as long as necessary by using additional magnet segments 16 and 17 to make up the desired length. In a typical application, two pairs of magnet segments 16 and 17 may be used. The wedges 21 and 22 are then made sufficiently long to support both pairs of magnet segments 16 and 17, and as many screws 28 and 29 are used as necessary to secure the wedges. Two pairs of screws 28 and 29 are shown in FIG. 2.

The construction of the present invention also has an added benefit of reducing the effects of cogging torques that are present in permanent magnet motors. Cogging torque is the "ratchet" effect that one feels when the armature of such a motor is turned manually in the presence of a strong magnetic field. It occurs due to the sharp side edge of the magnet lining up magnetically with a sharp edge of the armature. The usual method of reducing this effect is by skewing the slotted armature. However, skewing adds winding time and expense to the manufacture of the motor.

By using a permanent magnet with tapered side surfaces, the cogging torques effect is greatly reduced because the typically sharp magnet side edge is not present as the armature 14 passes beneath it, and there is no need to skew the armature.

While the invention has been described with respect to the design of a two-pole d.c. motor/generator, it should be understood that the structure can be employed in other designs in which it is necessary to hold magnet segments into place such as other types of electric motors and generators and combinations thereof.

For example, the design of the present invention could be readily adopted in a four-pole motor construction or other motors or generators having four or more poles. In a four-pole construction, four magnet segments and four wedges would be used, and the design would otherwise be the same as the design disclosed herein, with the same principles being used to secure the magnet segments to the stator yoke.

While the invention has been shown and described with respect to a particular embodiment thereof, this is for the purpose of illustration rather than limitation, and other variations and modifications of the specific embodiment herein shown and described will be apparent to those skilled in the art, all within the intended spirit and scope of the invention. Accordingly, the patent is not to be limited in scope and effect to the specific embodiment herein shown and described nor in any other way that is inconsistent with the extent to which the progress in the art has been advance by the invention.

What is claimed is:

1. A stator assembly for a dynamoelectric machine, comprising:
   a yoke having a smooth cylindrical interior surface;
   a pair of permanent magnet segments located on the interior surface of the yoke, each of the magnet segments having an arc shape forming a portion of a hollow cylinder, each of the magnet segments having an outer surface which fits against the interior surface of the yoke and having an inner surface, each of the magnet segments having axially extending side surfaces between the inner and outer surfaces, the side surfaces being tapered outwardly such that the outer surface of each of the magnet segments extends circumferentially beyond the inner surface of each of the magnet segments to form a tapering; and
   a pair of wedges located on the inner surface of the yoke to secure the magnet segments in place against the interior surface of the yoke, each of the wedges having an outer surface which matches the interior surface of the yoke and having an inner surface, each of the wedges having axially extending side surfaces which are tapered inwardly such that the inner surface of each of the wedges extends circumferentially beyond the outer surface of each of the wedges to form a tapering, the tapering of the wedges being opposite to the tapering on the magnet segments with at least one of the wedges holding the magnet segments in place against the interior surface of the yoke.

2. A stator assembly for a dynamoelectric machine as defined in claim 1, wherein the pair of magnet segments and the pair of wedges combine to form a hollow cylinder with the outer surface of the magnet segments and the outer surface of the wedges combining to form a generally cylindrical surface and the inner surface of the magnet segments and the inner surface of the wedges combining to form a generally cylindrical surface.

3. A dynamoelectric machine as defined in claim 1 including an armature rotatable within said stator assembly, wherein the tapered side surfaces of the magnet segments reduce cogging torque produced on the armature.

4. A stator assembly for a dynamoelectric machine as defined in claim 1, comprising in addition fastening means for attaching the pair of wedges to the yoke.

5. A stator assembly for a dynamoelectric machine as defined in claim 4, wherein the fastening means are screws.

6. A stator assembly for a dynamoelectric machine as defined in claim 4, wherein the fastening means include adhesive.

7. A stator assembly for a dynamoelectric machine as defined in claim 1, comprising in addition adhesive between the side surfaces of the magnet segments and the side surfaces of the wedges.

8. A stator assembly for a dynamoelectric machine as defined in claim 1, wherein the wedges are radially opposite each other.

9. A stator assembly for a dynamoelectric machine as defined in claim 1, wherein the wedges are substantially identical in shape.

10. A stator assembly for a dynamoelectric machine as defined in claim 1, wherein the magnet segments are radially opposite each other.

11. A stator assembly for a dynamoelectric machine as defined in claim 1, wherein the magnet segments are substantially identical in shape.

12. A stator assembly for a dynamoelectric machine as defined in claim 1, wherein the wedges are oriented at approximately 90° with respect to the magnet segments.

13. A stator assembly for a dynamoelectric machine, comprising:
    a yoke having a uniform cylindrical interior surface;
    a pair of permanent magnet segments located within the yoke against the interior surface;
    a pair of wedges located within the yoke to secure the magnet segments in place against the interior surface of the yoke; and
    means for attaching the wedges to the interior surface of the yoke;
    each of the magnet segments having an outer surface and an inner surface;
    each of the wedges having an outer surface and an inner surface;
    each of the magnet segments having planar side surfaces extending axially along the length of each of the magnet segments on each side of each of the magnet segments,
    each of the wedges having planar side surfaces extending axially along the length of each of the wedges on each side of each of the wedges,
    the side surfaces on at least one of the wedges engaging the side surfaces of each of the magnet segments to hold the magnet segments in place against the yoke,
    each of the planar side surfaces of each of the magnet segments contacting one of the planar side surfaces of one of the wedges to form a contact plane,
    the contact plane forming an acute angle with respect to a radial plane with the side surfaces of the magnet segments tapered inwardly from the outer surface to the inner surface and the side surfaces of the wedges tapered outwardly from the inner surface to the outer surface, so that the magnet segments are held against the interior surface of the yoke by the wedges.

14. A stator assembly for a dynamoelectric machine as defined in claim 13, wherein the pair of the wedges fit with the pair of magnet segments to form a hollow cylinder having a generally cylindrical outer surface fitting against the interior surface of the yoke and having a generally cylindrical inner surface.

15. A dynamoelectric machine as defined in claim 13 including an armature rotatable within said stator assembly, wherein the tapered side surfaces of the magnet segments reduce cogging torque produced on the armature.

16. A stator assembly for a dynamoelectric machine as defined in claim 13, wherein the attaching means are screws.

17. A stator assembly for a dynamoelectric machine as defined in claim 13, wherein the attaching means include adhesive.

18. A stator assembly for a dynamoelectric machine as defined in claim 13, comprising in addition adhesive between the side surfaces of the magnet segments and the side surfaces of the wedges.

19. A stator assembly for a dynamoelectric machine as defined in claim 13, wherein the wedges are radially opposite each other.

20. A stator assembly for a dynamoelectric machine as defined in claim 13, wherein the wedges are identical in shape.

21. A stator assembly for a dynamoelectric machine as defined in claim 13, wherein the magnet segments are radially opposite each other.

22. A stator assembly for a dynamoelectric machine as defined in claim 13, wherein the magnet segments are identical in shape.

23. A stator assembly for a dynamoelectric machine as defined in claim 13, wherein the wedges are oriented at approximately 90° with respect to the magnet segments.

* * * * *